June 14, 1949.  R. HUBER  2,473,204
FREE PISTON ENGINE CONTROL
Filed Jan. 28, 1947  5 Sheets-Sheet 1

Fig.1.

INVENTOR
Robert Huber
BY
Dean Fairbank & Hirsch
ATTORNEY

June 14, 1949.  R. HUBER  2,473,204
FREE PISTON ENGINE CONTROL
Filed Jan. 28, 1947  5 Sheets-Sheet 2

INVENTOR
Robert Huber
BY
ATTORNEY

June 14, 1949.  R. HUBER  2,473,204
FREE PISTON ENGINE CONTROL
Filed Jan. 28, 1947  5 Sheets-Sheet 4

INVENTOR
Robert Huber
BY
Dean Fairbank & Hirsch
ATTORNEY

Patented June 14, 1949

2,473,204

UNITED STATES PATENT OFFICE 2,473,204

FREE PISTON ENGINE CONTROL

Robert Huber, Paris, France, assignor to Societe d'Etudes et de Participations, Eau, Gaz, Electricite Energie S. A., Geneva, Switzerland, a society of Switzerland Application January 28, 1947, Serial No. 724,770
In France February 5, 1946

18 Claims. (Cl. 123—46)

The present invention relates to systems including two free piston generators of fluid under pressure intended to work with a given phase difference between them. The expression "free piston generators of fluid under pressure" is intended to designate either a motor compressor or an auto-generator, i. e. a machine including at least one motor portion and at least one compressor portion and in which the air compressed in the compressor portion is fed to the receiving machine or element, either directly (case of a motor compressor), or after having passed, at least partly, through the motor portion (case of an auto-generator).

The invention is more especially, although not exclusively, concerner, among these systems, with those including two auto-generators the respective casings of which, disposed about the respective motor cylinders and acting as air reservoirs for feeding and scavenging said motor cylinders, are in communication with each other.

The chief object of my invention is to provide a machine of this kind which is better adapted to meet the requirements of practice than those used for the same purpose up to the present time.

Preferred embodiments of my invention will be hereinafter described with reference to the accompanying drawings, given merely by way of example and in which.

In the following description, it will be supposed that the system with which my invention is concerned is constituted by two free pistons autogenerators A and B intended to work in opposed phase relation, i. e. with a 180° phase difference.

Figure 1:
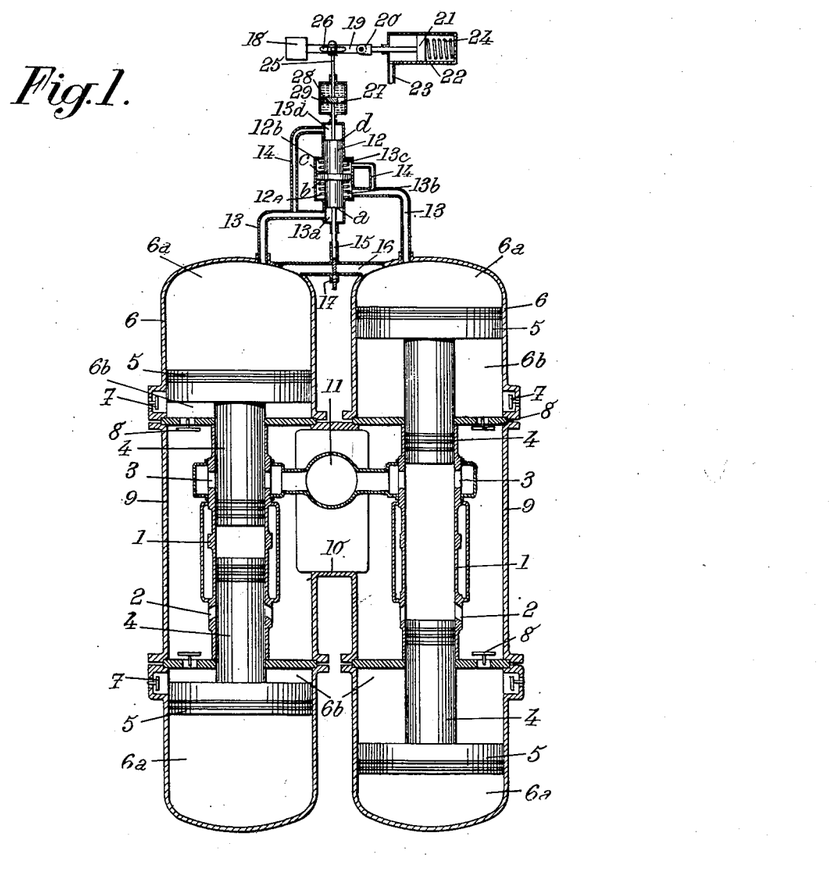
Fig. 1 is a diagrammatic axial section of a system constituted by two juxtaposed auto-generators intended to work in opposed phase relation.

Each of these generators includes for instance a motor cylinder 1 provided with inlet ports 2 and exhaust ports 3 adapted to cooperate with motor pistons 4 moving in opposed directions with respect to each other inside cylinder 1. Each of these motor pistons 4 is coupled with a compressor piston 5 working in a cylinder 6 so as to divide this cylinder into two chambers 6a and 6b. The outer chamber 6a constitutes the return energy pneumatic accumulator, whereas the inner chamber 6b constitutes the compressor space proper. This last mentioned chamber is provided with suction valve means 7 and delivery valve means 8, the latter opening into a casing 9 which surrounds motor cylinder 1 and which constitutes a reservoir of air for feeding and scavenging this cylinder through inlet ports 2.

Figure 10:
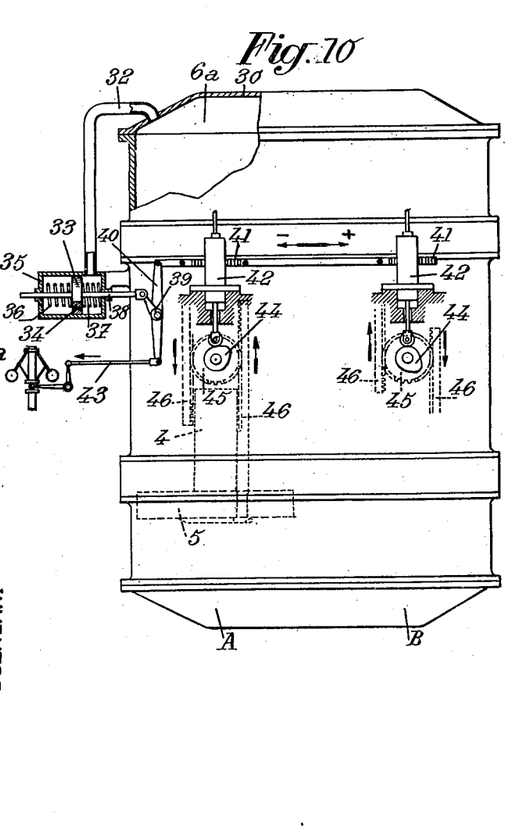
Fig. 10 is a diagrammatic view showing the means for regulating the injection pumps of the generators of Fig. 9.
Figure 12:
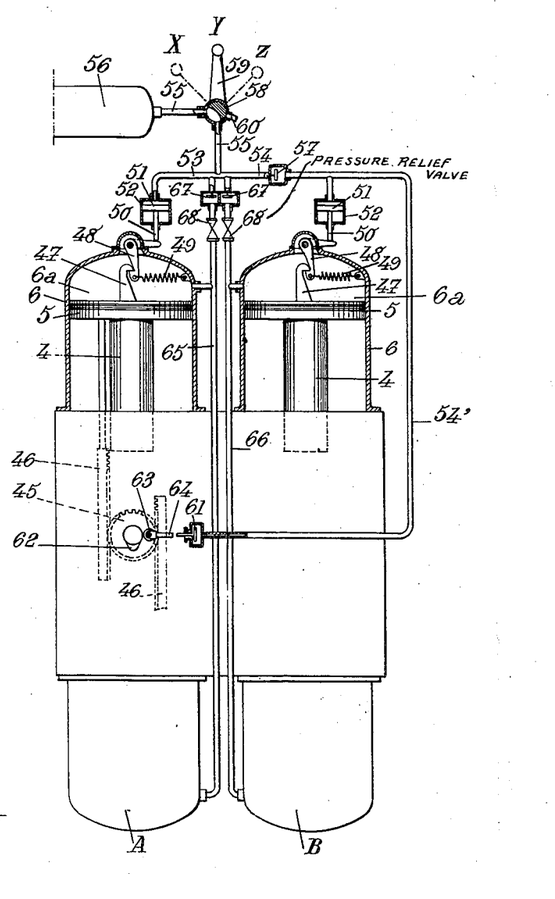
Figs. 12 and 13 show respectively two different starting devices for systems according to my invention.

The two groups of free pistons 4, 5 of each generator are interconnected through suitable synchronizing means. In Figs. 10 and 12, such synchronizing means are shown and include for instance a pinion 45 pivoted on a fixed axis and in mesh with two racks 46 rigid with the respective groups of pistons.

Each motor cylinder 1 is provided with fuel injection means, including for instance an injector (not visible on the drawing), and an injection pump (not shown in Fig. 1).

The casings 9 of generators A and B are preferably in communication through a conduit 10. If these generators A and B work in opposed phase relations, this communication between their casings 9 permits of considerably reducing the dimensions of these casings, while keeping the pressure on the inside thereof at a substantially constant value.

The exhaust ports 3 of motor cylinders 1 open preferably into a common exhaust pipe 11 which feeds the motor gases that escape through said ports 3 to a common receiving plant. If the two generators work in opposed phase relation, the pressure variations in exhaust pipe 11 are also reduced to a minimum.

In order to cause generators A and B to work in opposed phase relation, according to my invention, I make use of control means responsive to variations of the pressures existing in two respective spaces of generators A and B that have the same function in these two generators and vary in volume as the pistons are reciprocating.

These spaces may be constituted by the compressor chambers. However, according to the preferred embodiments shown by the drawing, the spaces in question are constituted by the chambers $6a$ that contain the air cushions for storing up energy for the return of the pistons.

The instantaneous pressures existing in said cushions are caused to act upon two annular surfaces $a$, $b$, of a floating piston $12$, whereas the mean pressures existing in said chambers $6a$ act upon two other annular surfaces $c$, $d$, of said piston $12$, respectively of the same areas as $a$ and $b$ but turned in the opposed direction. For this purpose, the spaces $13a$ and $13b$, limited by said surfaces $a$ and $b$ are in communication with chambers $6a$ through conduits $13$ of relatively large cross section so that the instantaneous pressures in these chambers are immediately transmitted to chambers $13a$, $13b$. On the other hand, the chambers $13c$ and $13d$ which are limited by surfaces $c$ and $d$ are in communication with chambers $6a$ through conduits $14$ of sufficiently small cross section for ensuring the transmission to said chambers $13c$, $13d$ of the mean pressures existing in the chambers $6a$ of generators A and B. Springs $12a$, $12b$ tend to keep piston $12$ in an intermediate position.

Under the effect of the respective pressures acting on surfaces $a$, $b$, $c$, $d$, piston $12$ undergoes displacements of variable amplitude intended to ensure or to maintain a phase difference of 180° between the operations of generators A and B. Control of the phase difference is advantageously obtained by varying the weights of the air cushions entrapped in said chambers $6a$ of the two generators. When the weight of one of these cushions is increased, the number of oscillations per unit of time of the movable pistons of the corresponding generator is increased, whereas when the weight of the air cushion of the generator is reduced, the number of oscillations per unit of time of the movable pistons of this generator is reduced.

According to a preferred embodiment of my invention, this variation of the weights of the air cushions is obtained by transferring a portion of the mass of air forming the air cushion of the generator running at too high a speed to the air cushion of the generator running at too low a speed. For this purpose, piston $12$ carries a slide valve $15$ inserted in a conduit $16$ extending between the accumulator chambers $6a$ of generators A and B. These two chambers $6a$ are thus brought into communication with each other as soon as the aperture $17$ of slide valve $15$ comes inside conduit $16$.

Figure 2:
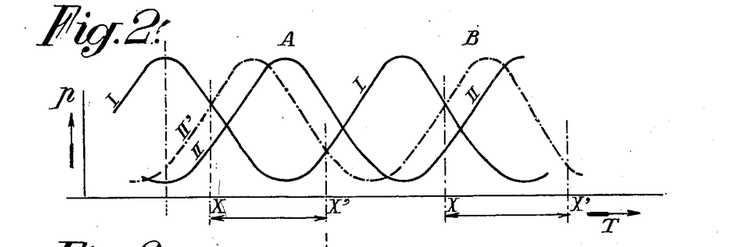
Figs. 2 and 3 are diagrams for explaining the operation of the system illustrated by Fig. 1.

This device works in the following manner:

Fig. 2 shows, as a function of time T, the pressures $p$ in chambers $6a$, sinusoid I showing the pressure variation in the chamber $6a$ of generator A and sinusoid II the pressure variation in the chamber $6a$ of generator B, these curves I and II corresponding to the working of the system in opposed phase relation. In these conditions, the sum of the instantaneous pressures acting on the surfaces $a$ and $b$ of piston $12$ varies as shown by the curve III of Fig. 3, this curve III being constituted by a sinusoid the amplitude of which is very small with respect to a horizontal line $2$ $pm$ corresponding to the sum of the mean pressures acting on the surfaces $c$ and $d$ of piston $12$. These pressure variations impart an oscillatory movement to piston $12$ but the amplitude of this movement is insufficient for bringing the aperture $17$ of slide valve $15$ into conduit $16$. Consequently, as long as generators A and B work in opposed phase relation, communication is stopped between the chambers $6a$ of these two generators and no amount of air is transferred from one to the other.

If now there is a modification in the phase relation between generators A and B, corresponding for instance to a greater lead of generator B with respect to generator A, the curve representing the pressure variations in the chamber $6a$ of generator B is displaced toward the left of the diagram of Fig. 2 so as to come into the position shown in dotted line at II'. As a consequence of this, the sum of the instantaneous pressures acting on surfaces $a$ and $b$ no longer varies according to the curve III of Fig. 3, but according to the curve IV of this figure. Now the period of this curve IV is equal to twice that of curve III, and its amplitude is much greater than that of curve III. Consequently, the amplitudes of the oscillatory motion of piston $12$ are much greater than when generators A and B work in opposed phase relation and slide valve $15$ is so displaced as to bring, for short periods of time, aperture $17$ into conduit $16$, thus producing a discontinuous communication to take place between the chambers $6a$ of generators A and B.

In order to obtain a correct working of the device, communication between the corresponding chambers $6a$ of the respective generators must occur during a period for which the pressure in the air cushion of the generator that has increased its lead with respect to the other is higher than the pressure in the air cushion of the latter. For instance, when, as above supposed, generator B has gained supplementary lead with respect to generator A, communication between the air cushions of the two generators must take place during one of the periods indicated at X, X' in Fig. 2. For this purpose, it suffices to give the oscillatory system constituted by piston $12$ and slide valve $15$ a natural frequency equal to the number of oscillations per unit of time of the movable parts of generators A and B. In this case, there exists between curve IV, which represents the sum of the instantaneous pressures in the air cushion of the generators, and curve V, which represents the oscillatory movement of system $12$, $15$, a phase difference equal to $$\frac{\pi}{2}$$

Due to this phase difference, the communication between the chambers $6a$ of the two generators is sure to occur during periods X—X', i. e. when the pressure in the air cushion $6a$ of generator B is higher than the pressure in the air cushion $6b$ of generator A. A portion of the air that forms the air cushion of generator B is thus transferred to the air cushion of generator A, which slows down the movements of the movable parts of generator B and accelerates the movements of the movable parts of generator A. Thus, the generators are restored to opposed phase relation working.

From what precedes, it appears that the oscillating system $12$, $15$ must have a natural frequency at least substantially equal to the frequency of oscillation of the movable parts of the generators in order to obtain a correct working of the device that maintains a given phase relation between the generators. But when the working pressure of the generators is variable, this variation involves a variation of the frequency of oscillation of the movable parts thereof.

It may therefore be advantageous to provide means for varying the mass of the oscillating system 12, 15 as a function of the working pressure of the generators. Such means include, for instance, an auxiliary mass 18 carried by an arm 19 pivoted at 20 to the rod of a piston 21 movable in a cylinder 22, this piston 21 being subjected on one of its sides to the action of the working pressure of the generators, transmitted through a conduit 23, while the other face of the piston is subjected to the action of a spring 24. Arm 19 is connected to piston 12 through a slot 26 in which is engaged a pin carried by the rod 25 of said piston, so that the multiplication movement with which the oscillatory motion of piston 12 is transmitted to auxiliary mass 18 varies as a function of the working pressure of the generators. The higher this working pressure, the lower this multiplication and a reduction of this multiplication is equivalent to a reduction of the mass of the oscillating system constituted by piston 12, slide valve 15, auxiliary mass 18 and the means through which these elements are interconnected. The natural frequency of said oscillating system therefore increases when the working pressure of the generators increases.

I further provide means for damping the displacements of piston 12, such means being constituted, in the embodiment shown by Fig. 1, by a piston 27 fixed to the rod 25 of piston 12 and provided with a calibrated aperture 28. This piston moves inside a cylinder 29 filled with a suitable liquid, for instance oil.

Figure 4:
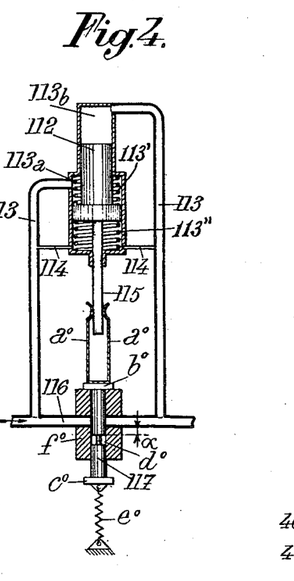
Fig. 4 shows a modification of the means for keeping the two generators in opposed phase relation, such means being applicable to a system of generators as illustrated by Fig. 1.
Figures 5, 6, 7, 8:
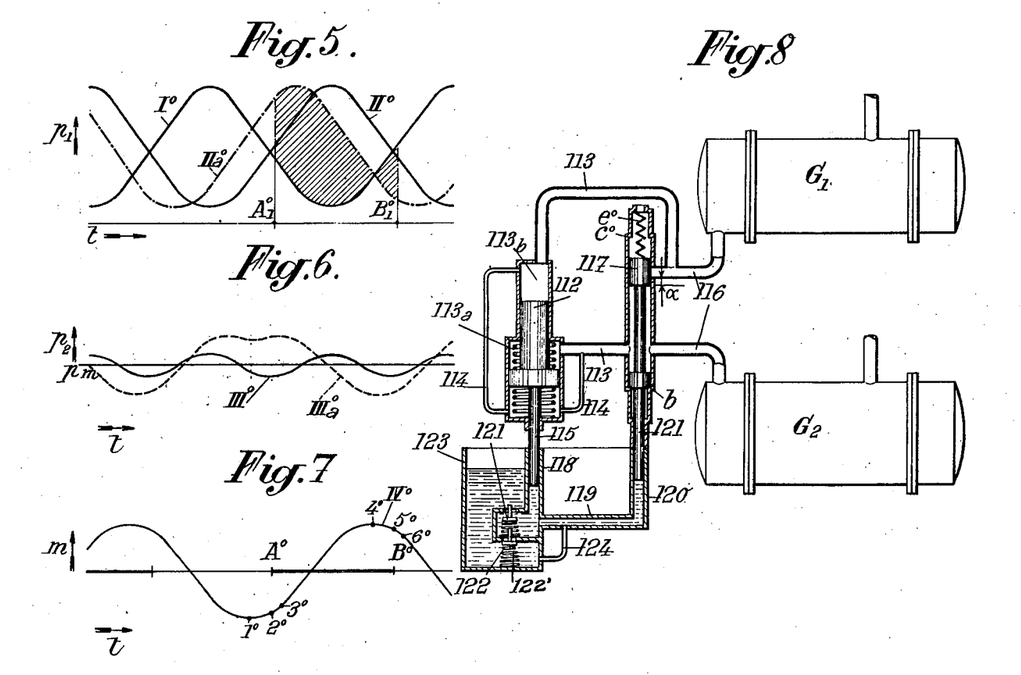
Figs. 5, 6 and 7 are explanatory diagrams relating to the operation of the means of Fig. 4.
Fig. 8 shows still another modification of the means for keeping the two generators in opposed phase relation.

The embodiments shown by Figs. 4 and 8 are provided to avoid the necessity of giving oscillating system 12—15 a natural frequency substantially equal to the frequency of oscillation of the pistons of the generator.

According to these embodiments, the floating piston subjected to the combined actions of the instantaneous pressures in the accumulator chambers of the generator is no longer rigidly connected with the valve means for controlling the communication between said accumulator chambers. Furthermore, said floating piston is given a natural frequency different from the frequency of oscillation of the generator pistons. Finally, the floating piston actuates the valve means in such manner that said valve means opens the communication between the accumulator chambers for nearly the whole of the strokes of said floating piston in one direction and closes said communication for nearly the whole of the strokes of said floating piston in the opposite direction.

The transmission means to be thus provided between the floating piston and the valve means may be of any suitable type. They may be mechanical, including for instance a friction connection (Fig. 4) or hydraulic (Fig. 8) and anyway capable of yielding when the valve means are stopped and the piston keeps moving, abutments being provided for limiting the displacements of said valve means.

In the embodiment shown by Fig. 4, as above described with reference to Fig. 1, the respective piston return pneumatic energy accumulator chambers (6a on Fig. 1 and not shown Fig. 4) are connected together by a conduit 116 in which is inserted the valve means 117.

The instantaneous pressures in the respective accumulator chambers are transmitted through conduits 113 of relatively large cross section to respective surfaces (facing in the same direction) of a stepped piston 112 similar to the floating piston 12 of Fig. 1. Furthermore, a third surface of this piston 112 (facing in the opposite direction) is subjected to the action of the mean pressure in the accumulator chambers, this mean pressure being transmitted through conduits 115 of small cross section branching off from conduit 113.

Piston 112 is mounted inside a corresponding stepped cylinder 113a—113b, the top chamber of portion 113a being connected with one of the conduits 113 while the bottom chamber of said portion 113a communicates with conduits 114.

Furthermore, two opposed springs 113', 113" provided in cylinder portion 113a tend to keep oscillating piston 112 in its intermediate position.

As above stated, the weight of oscillating piston 112 and the strength of the springs that act thereon are chosen in such manner that the natural frequency of this piston is quite different from the frequency of oscillation of the pistons of the generator.

The rod 115 of piston 112 is connected to valve means 117 through a friction connection constituted by two springs $a^o$ fixed to valve 117 and frictionally engaging opposed sides of rod 115. Valve 117 is provided with two abutments $b^o$ and $c^o$ and a groove $d^o$ and is subjected to the action of a spring $e^o$ tending to apply and to keep valve member 117 in the position thereof for which abutment $b^o$ is applied against the upper face of the casing $f^o$ in which said valve member 117 is slidable. In this position, groove $d^o$ is located outside of conduit 116 which is therefore stopped.

Furthermore, valve member 117 is so designed that it must be moved a distance equal to $a$ from the above mentioned position thereof (abutment $b^o$ applied against the upper face of casing $f^o$) to start opening conduit 116.

The device of Fig. 4 works in the following manner:

Fig. 5 shows the curves I° and II° of the pressures $p_1$ in the accumulator chambers of the two generators when said generators work in opposed phase relation (phase difference equal to 180°). In this case, the sum of the instantaneous pressures $p_2$, shown by Fig. 6, is the curve III°, also of sinusoidal shape, and the period of which is one half of that of curves I° and II° of Fig. 5, while its amplitude, as compared with the mean pressure in said accumulator chambers (represented by horizontal line $p_m$) is very small.

Piston 112, under the action of the pressure variations corresponding to curve III° (low amplitude and high frequency) undergoes oscillations of an amplitude smaller than $\alpha$. Conduit 116 therefore remains stopped by valve 117 as long as the opposed phase relation is preserved.

If the phase difference between the respective operations of the two generators undergoes a modification, for instance if curve II° of Fig. 5 becomes II°a, the sum of the instantaneous pressure acting on piston 112 will vary as shown by the curve III°a of Fig. 6. This curve III°a differs from curve III° not only in that its maximum amplitude is much greater but also by the fact that its period is equal to twice the period of curve III° and is therefore equal to the period of curves I° and II°.

The oscillations of piston 112 resulting from the pressure variations represented by curve III°a are therefore given a great amplitude so that valve 117 is brought into the position for which its groove $d$ coincides with conduit 116. Owing to the provision of friction transmission $a°$ between valve 117 and the rod 115 of piston 112 and owing to the action of abutments $b°$ and $c°$, the oscillatory displacements of valve 117 are limited and their amplitude is not necessarily equal to that of the movement of piston 112.

In the example shown by the drawing, at the beginning of the upward movement of piston 112, valve 117 also moves upwardly until abutment $c°$ comes into contact with casing $f°$. If piston 112 keeps moving upwardly, this movement has no longer any effect upon valve 117 which remains in its open position until piston 112 starts moving downwardly. As soon as this downward movement begins valve 117 is moved downwardly and this until abutment $b°$ is brought into contact with casing $f°$. If, then, piston 112 keeps moving in a downward direction, this piston has no effect upon the position of valve 117 which remains closed. Therefore, conduit 116 is open during practically the whole of the upward strokes of piston 112 and closed during practically the whole of the downward strokes of piston 112.

As long as valve 117 is in its upper position, air flows from the accumulator chamber where the pressure is higher into the other one. Therefore, the opening of conduit 116 must take place during the period for which the pressure is higher in the accumulator chamber of the generator that has gained a relative lead than in the accumulator chamber of the other generator.

Now, the natural frequency of oscillating piston 112 is different from the frequency of oscillations of the generator pistons.

Consequently, when the generators are no longer working in opposed phase relation, that is to say when the pressure in the accumulator chamber of the second generator is represented by curve II°a instead of II° and consequently the resultant of the pressures acting upon piston 112 is represented by curve III°a instead of III°, the movements of this piston are either in synchronism with the variations of this resultant pressure or in phase difference of 180° with said resultant pressure variations. The first case (synchronism) occurs when the frequency of the resultant pressure variations is lower than the natural frequency of oscillating piston 112, whereas the other case (180° phase difference) occurs when the frequency of the resultant pressure variations is higher than the natural frequency of piston 112. The device shown by Fig. 4 is supposed to correspond to the first case. Consequently the oscillating movement of piston 112 corresponds to the curve IV° of Fig. 7 when the sum of the instantaneous pressures acting on this piston varies according to curve III°a.

It should be noted that the shape of curves III°a and IV° would seem to indicate a phase difference of 180°, but in fact there is synchronism, because the displacements of piston 112 under the effect of the same instantaneous pressure acting thereon is maximum when said sum is maximum and minimum when said sum is minium. The apparent difference of phase between curves III°a and IV° is due to the fact that the instantaneous pressures tend to push piston 112 downwardly so that said piston is at the end of its downward stroke when the sum of the pressures is maximum.

The upward movement of piston 112 from its lowest position starts from point 1° of curve IV°. At the beginning of this upward movement, valve 117 follows the movement of piston 112 and, when piston 112 reaches point 2°, valve 117 starts opening conduit 116. Conduit 116 is fully opened when the position of piston 112 corresponds to point 3° of vurve IV°. Abutment $c°$ then comes into contact with casing $f°$ and valve 117 stops moving upwardly. Piston 112, on the contrary, keeps moving upwardly until its position corresponds to the top point 4° of curve IV°. During this last period, valve 117 has remained in its open position. From point 4° piston 112 starts moving downwardly and this movement is immediately transmitted to valve 117 which, besides, is being urged by spring $e°$ in the same direction. Conduit 116 is stopped by valve 117 when piston 112 comes to a position corresponding to point 5° and the abutment $b°$ of valve 117 comes into contact with casing $f°$ when piston 112 has come to position 6°. The period of opening of valve 117 therefore corresponds substantially to the whole of the upward movement of oscillating piston 112 whereas its period of closing corresponds substantially to the whole of the downward movement of said piston. The period of opening is indicated on the horizontal line of Fig. 7 by the thick line portion $A°—B°$. If this period is compared with the indications of Fig. 5, it is found that it corresponds to a period $A°_1—B°_1$ of Fig. 5 for which curve II°a (which corresponds to the generator to be slowed down) is mostly above curve I° (corresponding to the other generator).

As long as the pressure represented by curve II°a is higher than that represented by curve I°, the flow of air from one accumulator chamber to the other one takes place in the correct direction. It is true that, at the end of this period $A°_1—B°_1$, curve II°a passes below curve I°. But the amount of air which, during this portion of portion $A°_1—B°_1$, is allowed to flow in the opposite direction, is negligible as compared with the amount that has been flowing in the correct direction during most of said period $A°_1—B°_1$.

If the frequency of the variations of the resultant pressure acting on piston 112 were higher that the natural frequency of said piston, that is to say if the oscillating movement of piston 112 took place with a 180° phase difference with respect to the variations of this resultant pressure, the same result could be obtained by causing valve 117 to open the communication through conduit 116 not during its upward stroke but during its downward stroke.

Another embodiment of my invention is shown by Fig. 8. This figure relates to the case in which the two generators $G_1G_2$ are wholly independent, that is to say there is no communication between their respective casings as in Fig. 1.

Figure 3:
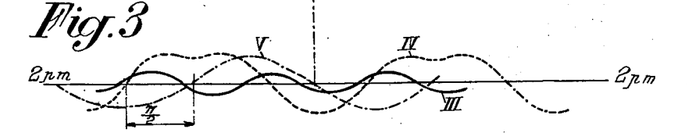

In Fig. 8, all the elements equivalent to those of Fig. 3 are designated by the same reference numbers respectively.

In the embodiment of Fig. 8, I provide, between oscillating piston 112 and valve 117, a hydraulic connection intended to play the same part as the friction connection of Fig. 4.

The rod 115 of piston 112 acts as a piston in a cylinder 118 connected through a conduit 119 with a cylinder 120 in which is slidably mounted a piston 121 rigid with valve 117. The inside of cylinders 118 and 120 is connected, with the interposition of a suction valve 121 and a discharge valve 122, with the inside of a vessel 123 filled with a suitable liquid, for instance oil. The spring 122' which acts on the valve 122 is stronger than the spring $e^0$ which acts on the slide valve 117. The valve 122 does not begin to open until the slide valve reaches abutment $c^0$.

A calibrated by-pass 124 is inserted in parallel with discharge valve 122, between the inside of spaces 118—119—120 and the inside of vessel 123. Thus, when the system is working under stable conditions, valve 117 is applied by a spring $e^0$ against abutment $b^0$, thus closing the communication through conduit 116.

The operation of the device of Fig. 8 is analogous to that of the device of Fig. 4, with the difference that communication through conduit 116 is opened during the downward movement of piston 112. Consequently, the frequency of operation of the generators must be higher than the natural frequency of piston 112.

As long as generators $G_1$—$G_2$ work in opposed phase relation, the variation of the sum of the instantaneous pressures that act upon piston 112 produces but a low amplitude oscillation of piston 112. Valve 117 therefore does not open the communication through conduit 116.

If the phase difference between the operation of the two generators becomes different from 180°, the sum of the pressures acting upon piston 112 now varies according to the curve $III°_a$ of Fig. 6. Therefore, upon every downward movement of piston 112, valve 117 is moved upwardly into contact with abutment $c^0$ and opens the communication through conduit 116.

If piston 112 then keeps moving downwardly, the rod 115 of said piston discharges a portion of the liquid contained in spaces 118—119—120 through valve 122 into vessel 123. When piston 112 stops and starts moving upwardly, valve 117 is moved downwardly until it reaches abutment $b^0$, thus closing the communication through conduit 116. If piston 112 then keeps moving upwardly, it causes a certain amount of liquid to be sucked in through valve 121 from reservoir 123 to fill up spaces 118—119—120.

Communication through conduit 116 is therefore open during substantially the whole of the downward movement of piston 112 and it is closed during substantially the whole of the upward movement of said piston. Transfer of air from one of the accumulator chambers to the other takes place in the suitable direction on account of the 180° phase difference existing between the oscillations of piston 112 and the variations of the resultant pressure that acts upon said piston.

According to another embodiment of my invention, I place in constant communication with each other two spaces in which work the respective pistons of the two generators and the pressure existing in these two spaces is caused to act for maintaining or restoring the desired phase relation between the workings of the two generators. Advantageously, the resultant pressure in said spaces is used to control the amounts of fuel fed to the respective generators so as to maintain or to restore the desired opposed phase relation. Preferably, the spaces thus placed in communication with each other are the accumulator chambers of the generators.

Figure 9:
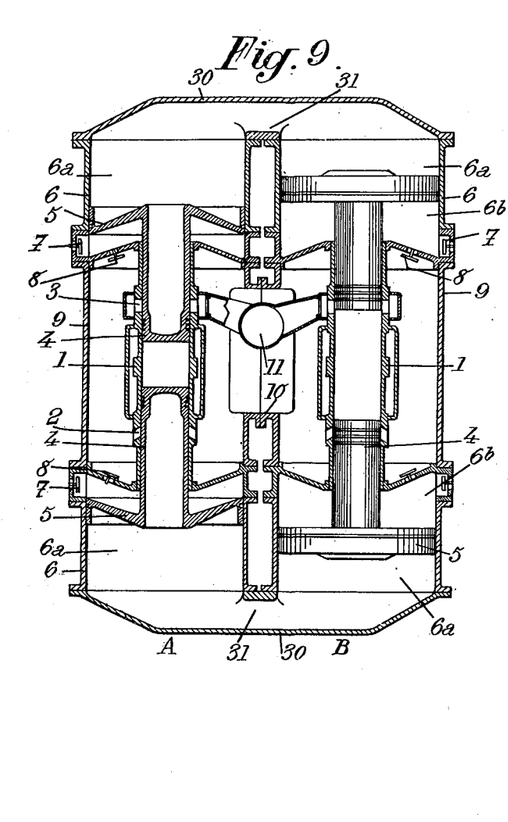
Fig. 9 is an axial sectional view of a system constituted by two juxtaposed auto-generators intended to work in opposed phase relation, this system being made according to another embodiment of my invention.

An example of this embodiment is shown by Figs. 9 and 10. According to this construction, the cylinders 6 of generators A and B are provided with a common cover 30, with a passage 31 for constantly connecting together the accumulator air cushions of these generators.

The pressure in said air cushions is transmitted through a conduit 32 to a control member 33 (Fig. 10) constituted by a piston provided with a calibrated hole 34 and movable in a cylinder 35, two opposed springs 36, 37 tending to keep piston 33 in an intermediate position. The rod 38 of piston 33 is connected through a crank lever 39 and eccentric with the lever 40 which operates the control rods 51 of the injection pumps 42 of generators A and B respectively. A rod 43 is also connected to lever 40 so as to permit of regulating the amount of fuel injected into the generators in accordance with the load of said generators. This rod 43 may be operated either manually or automatically, for instance by the regulator R of the turbine that is fed with the gases supplied by the accelerators.

Each of the injection pumps 42 is controlled by a cam 44, said cam being fixed on the axis of a pinion 45 which, in combination with racks 46, constitute the synchronizing gear of the corresponding generator. Cam 44 is fixed on the axis of pinion 45 in such manner that pump 42 is operated either when pistons of the corresponding generator are close to the ends of their inward strokes, when the pump is of a type directly producing the injection of fuel into the generator, or during the first half of the inward strokes of the pistons of the corresponding generator, when the fuel injection system is of the accumulation type.

Figure 11:
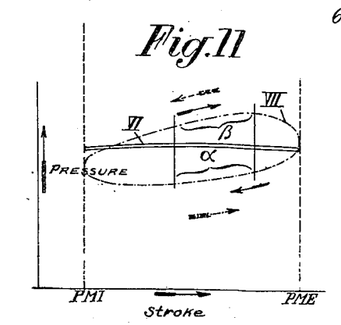
Fig. 11 is an explanatory diagram corresponding to the operation of the system of Figs. 4 and 5.

The system of Figs. 9 and 10 works in the following manner:

As long as the two generators work in opposed phase relation, the pressure in their communicating chambers 6$a$ remains substantially constant for the whole of the cycle (see curve VI in Fig. 11, representing the pressure as a function of the stroke) and piston 33 remains substantially in its intermediate position without acting on the fuel injection means of the two generators.

As soon as the desired opposed phase relation ceases to exist, the pressure in chambers 6$a$ varies as shown by curve VII in Fig. 11. For the generator that is running with a relative lead, this pressure remains above the value indicated by curve VI during practically the whole of the outward stroke of the pistons of this generator and below said value during practically the whole of the inward stroke of said pistons.

On the contrary, for the other generator, which is running with a relative lag, the pressure in cushion 6$a$ remains below the value indicated by curve VI during the outward stroke of the pistons of this generator and higher than them during the inward stroke of said pistons.

Pressure variation in said air cushions, as represented by the curve VII of Fig. 11, therefore takes place in the direction indicated by the solid lines arrows for the leading generator and by the dotted lines arrows for the lagging generator. The inner and outer dead centers are indicated in Fig. 11 respectively by PMI and PME.

From what precedes it appears that these pressure variations in the air cushions already tend to restore the opposed phase relation, by slowing down the leading generator and accelerating the lagging generator. However, in some cases, if no special means were provided for opposing the influence exerted by pressure variations in the air cushions on the length of the strokes of the pistons (which pressure variations have a tendency to shorten the piston strokes of the leading generator and to lengthen the piston strokes of the lagging generator), the effect produced by the slowing down of the first generator and the accelerating of the second generator might be insufficient for restoring opposed phase relation.

The special means in question are controlled by member 33 in the embodiment shown by Fig. 10. Member 33 has no action as long as generators A and B are in opposed phase relation, but it starts working as soon as the phase difference between the generators becomes different from 180°. Substantial pressure variation then occurs in chambers 6a and control member 33 which is subjected on one face thereof to the action of the instantaneous pressure in said chambers and on its other face to the action of the mean pressure therein, transmitted through calibrated orifice 34, starts oscillating and causes the amount of fuel supplied by pumps 42 to the corresponding injectors to vary in such manner that the amount injected into the motor portion of the leading generator is increased to prevent a reduction of the piston stroke length in this generator or even to obtain an increase of this piston stroke length, and that the amount of fuel injected into the motor portion of the lagging generator is reduced to avoid an increase of the piston stroke length in said generator or even to shorten this piston stroke length. Thus, the respective slowing down and accelerating actions due to pressure variations in the air cushions can work in an effective manner to restore the desired opposed phase relation.

Advantageously, the period for which the feed rate of the fuel to be injected into the motor portion of the generators is being adjusted should coincide with the period for which control member is moved to the maximum distance from its intermediate or neutral position. It is therefore necessary to obtain a certain interrelation between the oscillations of member 33 and those of the pistons of the generators. This interrelation depends upon the nature of the fuel injection device, which may be either of the accumulation type or of the direct injection type.

When the fuel injection device is of the accumulation type, fuel feed rate adjustment must take place during the first half of the inward stroke of the piston of the corresponding generator. This portion of the piston inward stroke corresponds, for the leading generator, with portion $a$ of curve VII (Fig. 11) and, for the lagging generator, with portion $\beta$ of said curve, these portions being those for which the differences between the instantaneous pressures in the air cushions and their mean value are maximum. In this case, member 33 must therefore oscillate either in phase with the oscillations of the piston or in phase difference of 180° therewith. Such oscillations of member 33 are obtained by giving it either a natural frequency greater than the frequency of oscillation of the pistons, in which case member 33 oscillates in phase with the movement of said pistons, or a natural frequency smaller than that of the pistons, in which case the oscillations of member 33 are in phase difference of 180° with those of the pistons.

When the fuel injection device is of the direct action type, fuel feed rate adjustment takes place when the pressures in the air cushions, even if the generators do not work in opposed phase relation, are little different from the mean pressure. In order to have, however, the oscillations of control member 33 of maximum amplitude during fuel feed rate adjustment, said member must be so arranged that its oscillations are in phase difference of 90° with those of the generators. This is obtained by giving member 33 a natural frequency equal to that of the oscillations of the movable parts of the generator.

The systems above described are of simple construction and reliable operation. One of the generators can be kept working after the other has been stopped.

I will now describe means for starting generators intended to work in opposed phase relation.

According to an embodiment, which may be applied both to machines of the kind illustrated by Fig. 1 and to machines of the kind illustrated by Figs. 9 and 10, the movable parts at least one of the two generators are locked in starting position and means operative in response to the displacements of the movable parts of the other generators (started first), are provided for bringing the locking means out of action when the movable parts of the second mentioned generator are close to the ends of their inward strokes.

An example of this first embodiment is shown by Fig. 12 which corresponds to a machine of the kind shown by Fig. 1.

One of the movable parts 4, 5 of each of the generators A and B is provided with a hook 47 adapted to coact with a second hook 48 pivoted to the cover of cylinder 6. Hook 48 is subjected on the one hand to the action of spring 49 which tends to disengage hooks 47 and 48 from each other, and on the other hand to the action of the rod 50 of a piston 51 which tends to engage hook 48 with hook 47 under the action of the air pressure exerted on the face of piston 51 opposed to rod 50.

Cylinders 52 are both connected, through conduits 53 and 54 respectively, with a conduit 55 opening into a compressed air reservoir 56. In one of these conduits 53, 54 (54 in the example shown), there is provided a check valve 57. Furthermore, conduit 55 is provided with a cock 58 the operating handle of which can assume three different positions X, Y, Z. In position Y, cock 58 places reservoir 56 in communication with conduits 53 and 54. In position Z, this cock closes conduits 53 and 54. And finally, in position X, it connects both of these conduits with the atmosphere through an exhaust conduit 60.

The portion of conduit 54 that is immediately adjacent to its cylinder 52 is connected with a conduit 54' leading to a valve 61 the opening of which connects said cylinder 52 with the atmosphere through said conduit 54'. Valve 61 is operated by a cam 62 fixed on the axis of pinion 45, which belongs to the synchronizing gear of generator A. Cam 62 cooperates with a roller 63 mounted on one end of a rod 64 in such manner as to open valve 61 when the pistons of generator A are at the ends of their inward strokes.

Finally, conduits 65 and 66 are provided to connect conduits 53 and 54 (the latter on the side of check valve 57 opposed to conduit 54') respectively with the air chambers 6a of generators A and B, a check valve 67 and, preferably, a pressure relief device 68 being interposed in each of these conduits 65 and 66.

The starting device of Fig. 12 works in the following manner:

The pistons of the generators are first placed in their starting positions, corresponding for instance, as shown, to the ends of their outward strokes. Then handle 59 is brought into position Y, which brings reservoir 56 in communication with conduits 53 and 54. Thus air under pressure is fed on the one hand into cylinders 52 where it acts in such manner as to hold hooks 48 in engagement with hooks 47, thus locking the generator pistons in their starting positions, and on the other hand into chambers 6a, where it will start said pistons working once the locking means are brought out of action.

Handle 59 is then brought into position X for which cock 58 connects conduit 53 with the atmosphere. The piston locking means of generator A is thus released and spring 49 moves hook 48 away from hook 47, so that generator A is started by the compressed air present in its chambers 6a.

Due to the presence of check valve 57 in conduit 54, the cylinder 52 corresponding to generator B is still under pressure. But when the pistons of generator A reach the ends of their inward strokes, cam 62 opens valve 61 and the air under pressure in said last mentioned cylinder 52 escapes to the atmosphere through conduit 54', thus releasing piston 51 which kept the hooks 47 and 48 of generator B in engagement with each other. These hooks are then brought out of engagement by spring 49 and generator B is started by the air pressure in its chamber 6a.

The two generators are thus started with a phase difference of substantially 180° between them.

Of course, while the release of the locking means applied to the pistons of generator B is ensured, in the example above described, by a cam 62 operative by the displacements of the pistons of generator A, any other factor of operation of said last mentioned generator might be used for this purpose (for instance the pressure in the accumulator chambers 6a of this generator.)

According to another embodiment of the starting device, the movable elements of the generators intended to work in opposed phase relation are started simultaneously and from initial positions that do not, as a rule, correspond to opposed phase relation working. For instance, as shown by the drawing, the starting position of generator A corresponds to the ends of the outward strokes of the pistons 4 and 5 of said generator whereas the starting position of generator B is that for which motor pistons 4 just close the inlet ports 2 and the outlet ports 3 of motor cylinder 1 (see Fig. 13). The pistons of both generators are thus started simultaneously, with a phase difference which is not yet equal to 180°. The desired 180° phase difference is in this case obtained a certain time after the generators have been started, owing to the action of the means for restoring said 180° phase difference.

Figure 13:
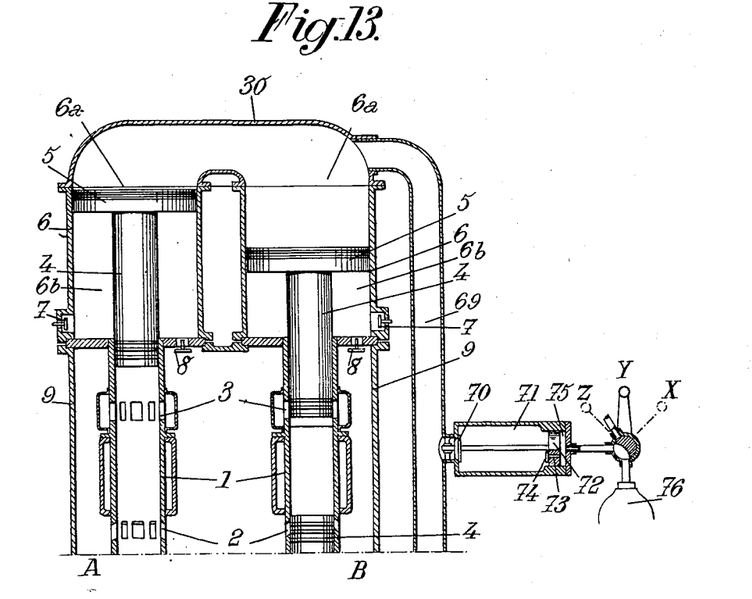

Fig. 13 shows an embodiment of such a starting device, in the case of two generators A and B having accumulator chambers in permanent communication with each other, according to the arrangement above described with reference to Figs. 9 and 10.

The air under pressure for starting the generators is fed to chambers 6a through a conduit 69. The means for feeding said air to said conduit include a starting reservoir 71 provided with a valve 70 for connecting it with conduit 69. Valve 70 is coupled with a piston 72 through which extends a passage 73 controlled by a check valve 74. The space 75 on the outer side of piston 72 is connected with a source of air under pressure 76 through a cock adapted to occupy three different positions X, Y, Z analogous to those occupied by cock 58 in Fig. 12. This device works in the following manner: Reservoir 71 is first filled with air under pressure. Then chamber 75 is opened to the atmosphere, which causes piston 72 to open valve 70, under the effect of the pressure existing inside the reservoir on the left hand side of said piston. The air under pressure present in reservoir 71 is then allowed to flow into chambers 6a, thus starting simultaneously both generators.

The phase difference between said generators is caused, shortly after this starting operation, to equal 180° through the action of the phase difference correcting means above described with reference to Figs. 9 and 10.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers, an oscillatable control member, means for subjecting said control member to the combined actions of the pressures in two corresponding chambers of said engines, respectively, and means operative by said control member for influencing the frequency of operation of at least one of said engines automatically to restore a given phase difference between the operations of said engines.

2. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers, an oscillatable control member, means for subjecting said control member to the combined actions of the instantaneous pressures in two corresponding chambers of said engines, respectively, said means being adapted to cause said member to oscillate with amplitudes below a given value as long as said engines work in synchronism with each other with a 180° phase difference and to oscillate with amplitudes above said given value when said 180° phase difference is no longer maintained, and means operative by said control member oscillating with an amplitude above said given value for varying the frequency of operation of at least one of said engines to restore said 180° phase difference.

3. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers including, for each engine, at least one piston return pneumatic energy accumulator chamber, an oscillatable control member, means for subjecting said control member to the combined actions of the pressures in said two accumulator chambers respectively, and means operative by said control member for influencing the frequency of operation of at least one of said engines automatically to restore a given phase difference between the operations of said engines.

4. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers including, for each engine, at least one piston return pneumatic energy accumulator chamber, a conduit extending from one of said accumulator chambers to the other one, an oscillatable control member, means for subjecting said control member to the combined actions of the pressures in said two accumulator chambers respectively, and valve means in said conduit operative by said control member so as to be opened, in case of the phase difference between the operations of said engines getting different from a given value, for at least a portion of the time periods for which the pressure in the accumulator chamber of the engine that has gained an extra lead is higher than the pressure in the accumulator chamber of the other engine.

5. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers including, for each engine, at least one piston return pneumatic energy accumulator chamber, a floating piston, means for subjecting said floating piston both to the combined actions of the instantaneous pressures in said two accumulator chambers respectively acting in one direction and to the action of the mean pressure in at least one of said accumulator chambers acting in the opposed direction, and means operative by said floating piston for influencing the frequency of operation of at least one of said engines automatically to restore a given phase difference between the operations of said engines.

6. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers including, for each engine, at least one piston return pneumatic energy accumulator chamber, a conduit extending from one of said accumulator chambers to the other one, an oscillatable control member, means for subjecting said control member to the combined actions of the pressures in said two accumulator chambers, respectively, and valve means in said conduit positively operative by said control member so as to be opened, in case of the phase difference between the operations of said generators getting different from a given value, for at least a portion of the time periods for which the pressure in the accumulator chamber of the engine that has gained an extra lead is higher than the pressure in the accumulator chamber of the other engine, the system constituted by said control member and said valve means having a natural frequency substantially equal to the frequency of operation of said engines.

7. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers including, for each engine, at least one piston return pneumatic energy accumulator chamber, a conduit extending from one of said accumulator chambers to the other one, an oscillatable control member, means for subjecting said control member to the combined actions of the pressures in said two accumulator chambers, respectively, valve means in said conduit positively operative by said control member so as to be opened, in case of the phase difference between the operations of said engines getting different from a given value, for at least a portion of the time periods for which the pressure in the accumulator chamber of the engine that has gained an extra lead is higher than the pressure in the accumulator chamber of the other engine, and means operative in response to variations of the working pressure of at least one engine for automatically adjusting the natural frequency of the system constituted by said control member, and said valve means to a value substantially equal to the frequency of operation of said engines.

8. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers including, for each engine, at least one piston return pneumatic energy accumulator chamber, a conduit extending from one of said acmulator chambers to the other one, a floating piston, means for subjecting said floating piston both to the combined actions of the instantaneous pressures in said two accumulator chambers, respectively, acting in one direction, and to the action of the mean pressure in at least one of said accumulator chambers, in the opposed direction, valve means in said conduit positively operative by said floating piston so as to be opened, in case of the phase difference between the operations of said engines getting different from a given value, for at least a portion of the time periods for which the pressure in the accumulator chamber of the engine that has gained an extra lead is higher than the pressure in the accumulator chamber of the other engine, an oscillating auxiliary mass operatively connected with said floating piston with an adjustable lever arm transmission, and means for varying said lever arm in response to variations of the working pressure of at least one engine so as automatically to adjust the natural frequency of the system constituted by said control member floating piston, said valve means and said auxiliary mass to a value substantially equal to the frequency of operation of said engines.

9. A combination according to claim 1 further including means for braking the oscillations of said control member.

10. In combination, two free piston engines each including at least one motor cylinder and one compressor cylinder interconnected together and at least one motor piston and one compressor piston interconnected together, said pistons being adapted to cooperate with said cylinders respectively so as to form several variable volume chambers including, for each engine, at least one piston return pneumatic energy accumulator cham-ber, a conduit extending from one of said accumulator chambers to the other one, an oscillatable control member having a natural frequency different from the frequency of operation of said engines, means for subjecting said control member to the combined actions of the pressures in said two accumulator chambers respectively, and valve means in said conduit operative by said control member, in case of the phase difference between the operations of said engines getting different from a given value, to be opened substantially during every stroke of said control member in one direction and closed substantially during every stroke of said control member in the opposed direction so as to restore said given phase difference between the operations of said engines.

11. In combination, two free piston engines each including at least one motor cylinder and one compressor cylinder interconnected together and a motor piston and a compressor piston interconnected together, said pistons being adapted to cooperate with said cylinders respectively so as to form several variable volume chambers including for each engine, at least one piston return pneumatic energy accumulator chamber, a conduit extending from one of said accumulator chambers to the other one, valve means in said conduit for controlling the communication therethrough, an oscillatable control member having a natural frequency different from the frequency of operation of said engines, means for subjecting said control member to the combined actions of the instantaneous pressures in said two accumulator chambers respectively, said last mentioned means being adapted to cause said member to oscillate with amplitudes below a given value as long as said engines work in synchronism with each other with a 180° phase difference and to oscillate with amplitudes above said given value when said 180° phase difference is no longer maintained, non-elastic yielding means for transmitting the oscillations of said control member to said valve means, said valve means being adjusted to remain closed for amplitudes of oscillation of said control member below said given value and to be opened as soon as said amplitude exceeds said value, and abutment means for limiting the displacements of said valve means under the action of said transmission means to a value corresponding to the opening of said valve means.

12. In combination, two free piston engines each including at least one motor cylinder and one compressor cylinder interconnected together and a motor piston and a compressor piston interconnected together, said pistons being adapted to cooperate with said cylinders respectively so as to form several variable volume chambers including for each engine, at least one piston return pneumatic energy accumulator chamber, a conduit extending from one of said accumulator chambers to the other one, valve means in said conduit for controlling the communication therethrough, a floating piston having a natural frequency different from the frequency of operation of said engines, means for subjecting said floating piston to the combined actions of the instantaneous pressures in said two accumulator chambers respectively, acting in one direction, and to the action of the mean pressure in at least one of said accumulator chambers, in the opposed direction, said last mentioned means being adapted to cause said floating piston to oscillate with amplitudes below a given value as long as said engines work in synchronism with each other with a 180° phase difference and to oscillate with amplitudes above said given value when said 180° phase difference is no longer maintained, non-elastic yielding means for transmitting the oscillations of said floating piston to said valve means, said valve means being adjusted to remain closed for amplitudes of oscillation of said floating piston below said given value and to be opened as soon as said amplitude exceeds said value, and abutment means for limiting the displacements of said valve means under the action of said transmission means to a value corresponding to the opening of said valve means.

13. In combination, two free piston engines each including at least one motor cylinder and one compressor cylinder interconnected together and a motor piston and a compressor piston interconnected together, said pistons being adapted to cooperate with said cylinders respectively so as to form several variable volume chambers including for each engine, at least one piston return pneumatic energy accumulator chamber, a conduit extending from one of said accumulator chambers to the other one, valve means in said conduit for controlling the communication therethrough, an oscillatable control member having a natural frequency different from the frequency of operation of said engines, means for subjecting said control member to the combined actions of the instantaneous pressures in said two accumulator chambers respectively, said last mentioned means being adapted to cause said member to oscillate with amplitudes below a given value as long as said engines work in synchronism with each other with a 180° phase difference and to oscillate with amplitudes above said given value when said 180° phase difference is no longer maintained, friction yielding means for transmitting the oscillations of said control member to said valve means, said valve means being adjusted to remain closed for amplitudes of oscillation of said control member below said given value and to be opened as soon as said amplitude exceeds said value, and abutment means for limiting the displacements of said valve means under the action of said transmission means to a value corresponding to the opening of said valve means.

14. In combination, two free piston engines each including at least one motor cylinder and one compressor cylinder interconnected together and a motor piston and a compressor piston interconnected together, said pistons being adapted to cooperate with said cylinders respectively so as to form several variable volume chambers including for each engine, at least one piston return pneumatic energy accumulator chamber, a conduit extending from one of said accumulator chambers to the other one, valve means in said conduit for controlling the communication therethrough, an oscillatable control member having a natural frequency different from the frequency of operation of said engines, means for subjecting said control member to the combined actions of the instantaneous pressures in said two accumulator chambers respectively, said last mentioned means being adapted to cause said member to oscillate with amplitudes below a given value as long as said engines work in cynchronism with each other with a 180° phase difference and to oscillate with amplitudes above said given value when said 180° phase difference is no longer maintained, hydraulic yielding means for transmitting the oscillations of said control member to said valve means, said valve means being adjusted to remain closed for amplitudes of oscillation of said control member below said given value and to be opened as soon as said amplitude exceeds said value, and abutment means for limiting the displacements of said valve means under the action of said transmission means to a value corresponding to the opening of said valve means.

15. In combination, two free piston engines each including at least one motor cylinder and one compressor cylinder interconnected together, and at least one motor piston and one compressor piston interconnected together, said pistons being adapted to cooperate with said cylinders respectively so as to form several variable volume chambers including, for each engine, at least one piston return pneumatic energy accumulator chamber, said engines being adjusted to work in synchronism with a 180° phase difference, means for permanently interconnecting said accumulator chambers, and a control member subjected to the combined actions of the instantaneous pressures in two said accumulator chambers respectively, to maintain and restore said 180° phase difference.

16. In combination, two free piston engines each including at least one motor cylinder and one compressor cylinder interconnected together, at least one motor piston and one compressor piston interconnected together, said pistons being adapted to cooperate with said cylinders respectively so as to form several variable volume chambers including, for each engine, at least one piston return pneumatic energy accumulator chamber and means for injecting fuel into said motor cylinders, said engines being adjusted to work in synchronism with a 180° phase difference, means for permanently interconnecting said accumulator chambers, an oscillatable control member, means for subjecting said control member to the combined actions of the instantaneous pressures in said two accumulator chambers respectively, said last mentioned means being adapted to cause said member to oscillate with amplitudes below a given value as long as said 180° phase difference is maintained and to oscillate with amplitudes above said given value when said 180° phase difference is no longer maintained, and means operative by said control member oscillating with an amplitude above said given value for varying the feed rate of at least one of said fuel injecting means to cooperate in restoring said 180° phase difference.

17. In combination, two free piston engines each including at least one motor cylinder and one compressor cylinder interconnected together, and at least one motor piston and one compressor piston interconnected together, said pistons being adapted to cooperate with said cylinders respectively so as to form several variable volume chambers including, for each engine, at least one piston return pneumatic energy accumulator chamber, said engines being adjusted to work in synchronism with a 180° phase difference, and means for automatically restoring said 180° phase difference.

18. In combination, two free piston engines each including at least one motor cylinder and one compressor cylinder interconnected together, and at least one motor piston and one compressor piston interconnected together, said pistons being adapted to cooperate with said cylinders respectively so as to form several variable volume chambers including, for each engine, at least one piston return pneumatic energy accumulator chamber, said engines being adjusted to work in synchronism with a 180° phase difference, a conduit extending from one end of said accumulator conduits to the other, valve means in said conduit and means responsive to variations in the phase difference between the operations of said engines adapted, in case of said phase difference getting different from 180°, to open said valve means for at least a portion of the time periods for which the pressure in the accumulator chamber of the engine that has gained an extra lead is higher than the pressure in the accumulator chamber of the other engine.

ROBERT HUBER.

REFERENCES CITED

The following references are of record in the file of this patent:

UNITED STATES PATENTS

| Number | Name | Date |
|---|---|---|
| 1,353,100 | Wales | Sept. 14, 1920 |
| 2,139,425 | Steiner | Dec. 6, 1938 |
| 2,253,530 | Pateras Pescara | Aug. 26, 1941 |
| 2,260,252 | John et al. | Oct. 21, 1941 |

FOREIGN PATENTS

| Number | Country | Date |
|---|---|---|
| 366,046 | France | 1906 |